United States Patent
Mills

(10) Patent No.: US 7,328,865 B1
(45) Date of Patent: Feb. 12, 2008

(54) PEPPERMILL LID

(75) Inventor: Randall Mills, Sultan, WA (US)

(73) Assignee: Progressive International Corporation, Kent, WA (US)

( * ) Notice: Subject to any disclaimer, the term of this patent is extended or adjusted under 35 U.S.C. 154(b) by 0 days.

(21) Appl. No.: 11/461,946

(22) Filed: Aug. 2, 2006

(51) Int. Cl.
*A47J 42/04* (2006.01)
(52) U.S. Cl. .................... 241/169.1; 241/168
(58) Field of Classification Search ........... 241/168, 241/169, 169.1
See application file for complete search history.

(56) References Cited

U.S. PATENT DOCUMENTS

| | | | |
|---|---|---|---|
| 4,771,955 A | * | 9/1988 | Paulson ............ 241/169.1 |
| 6,443,377 B1 | | 9/2002 | Cheng |
| D495,212 S | | 8/2004 | Martin |
| 2002/0117566 A1 | | 8/2002 | Cheng |
| 2005/0211806 A1 | * | 9/2005 | Ng ............ 241/169.1 |
| 2006/0261198 A1 | * | 11/2006 | Lee ............ 241/169.1 |

* cited by examiner

Primary Examiner—Faye Francis
(74) Attorney, Agent, or Firm—Black Lowe & Graham, PLLC

(57) ABSTRACT

A peppermill includes a body having upper and lower ends and defining a cavity extending between the upper and lower ends. The body defines a gap extending therethrough substantially perpendicular to a longitudinal axis of the body. A grinding mechanism is positioned within the body between the upper and lower ends. A cap rotatably secures to the body over the lower opening. A lateral opening extends through the cap in a direction substantially perpendicular to the longitudinal axis and is alignable with the gap. The cap mounts to an insert secured within the cavity near the lower opening. The insert includes an insert opening. The cap rotatably mounts to the insert and further includes an arcuate flange positioned over the insert opening when the lateral opening is not aligned with the gap.

8 Claims, 3 Drawing Sheets

PEPPERMILL LID

FIELD OF THE INVENTION

This invention relates generally to peppermills and, more specifically, to closure systems for peppermills.

BACKGROUND OF THE INVENTION

Fresh ground pepper from a peppermill often comes at the expense of a great deal of cleaning. A typical peppermill includes a main body with a cavity for receiving peppercorns, a grinding mechanism positioned near the bottom of the case, and a knob for actuating the grinding mechanism positioned at the top of the case. The grinding mechanism empties the ground pepper through the bottom of the peppermill. The ground pepper often does not all immediately fall from the grinding mechanism, but rather works its way out as the peppermill is moved or placed on a table or shelf. Wherever the peppermill is placed, ground pepper will be left behind.

It would therefore be an advancement in the art to provide a peppermill providing a convenient and effective means for distributing ground pepper while preventing accidental release of remnants of ground pepper when the peppermill is not in use.

SUMMARY OF THE INVENTION

A peppermill may be constructed in a variety of forms, such as a body having upper and lower ends and defining a cavity extending between the upper and lower ends. Whole peppercorns are stored in the cavity and ground to a desired degree of coarseness by a grinding mechanism.

In one example, a cap rotatably secures to the body over the lower opening. An opening extends through the cap to allow ground pepper to fall from the mill. The opening may be closed to prevent ground pepper from escaping. The opening may be formed in the rim of the cap and be alignable with a gap or opening formed in the body of the peppermill. In such an embodiment, the opening in the cap may be closed by positioning the opening over a portion of the body.

In another embodiment, the cap secures to an insert positioned within the cavity. The insert includes an opening alignable with the opening in the cap. A flange secured to the cap may be used to cover the opening in the insert when the cap opening is not aligned with the insert opening.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
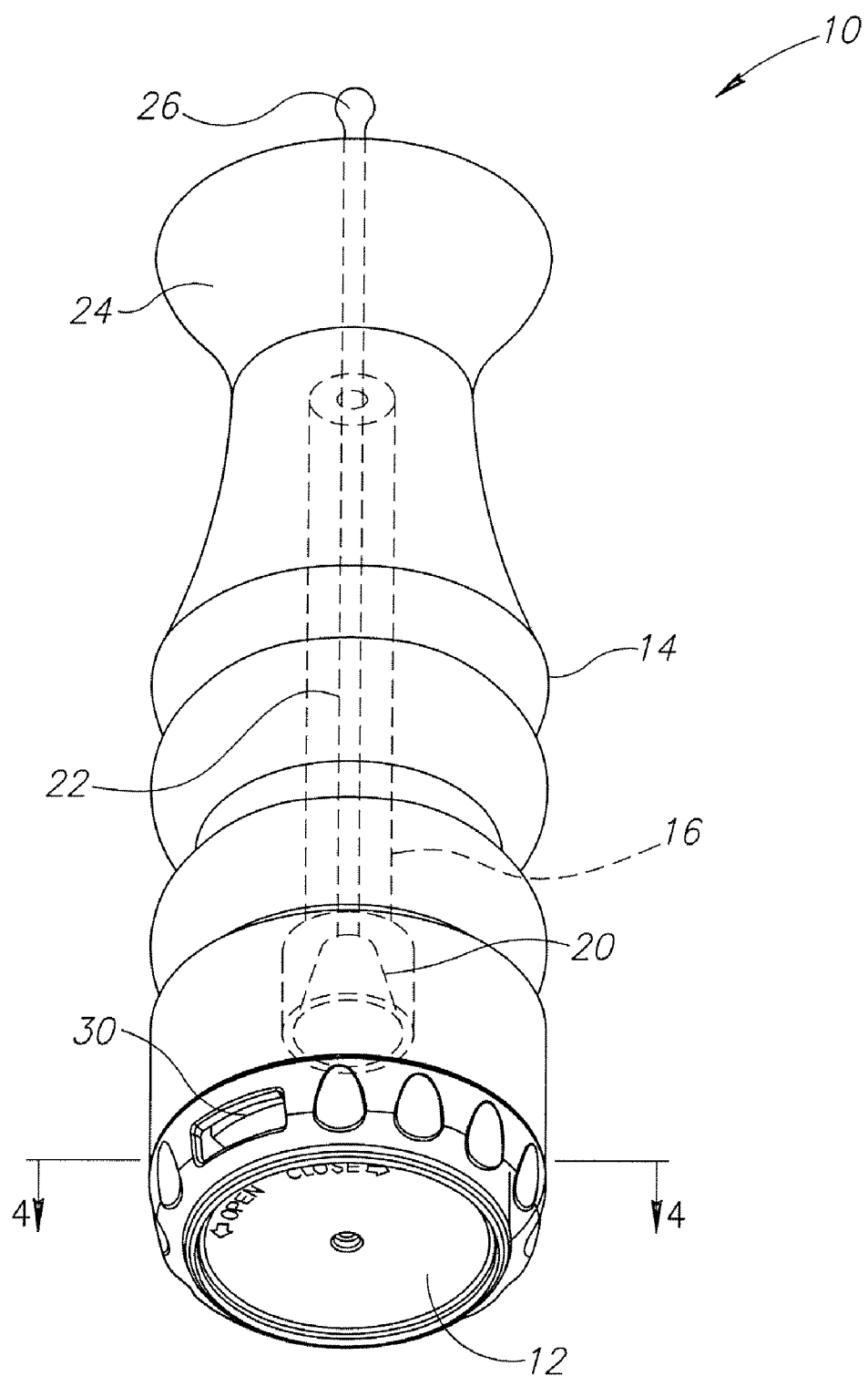
FIG. 1 is a perspective view of an assembled peppermill, in accordance with an embodiment of the present invention.
Figure 2B:
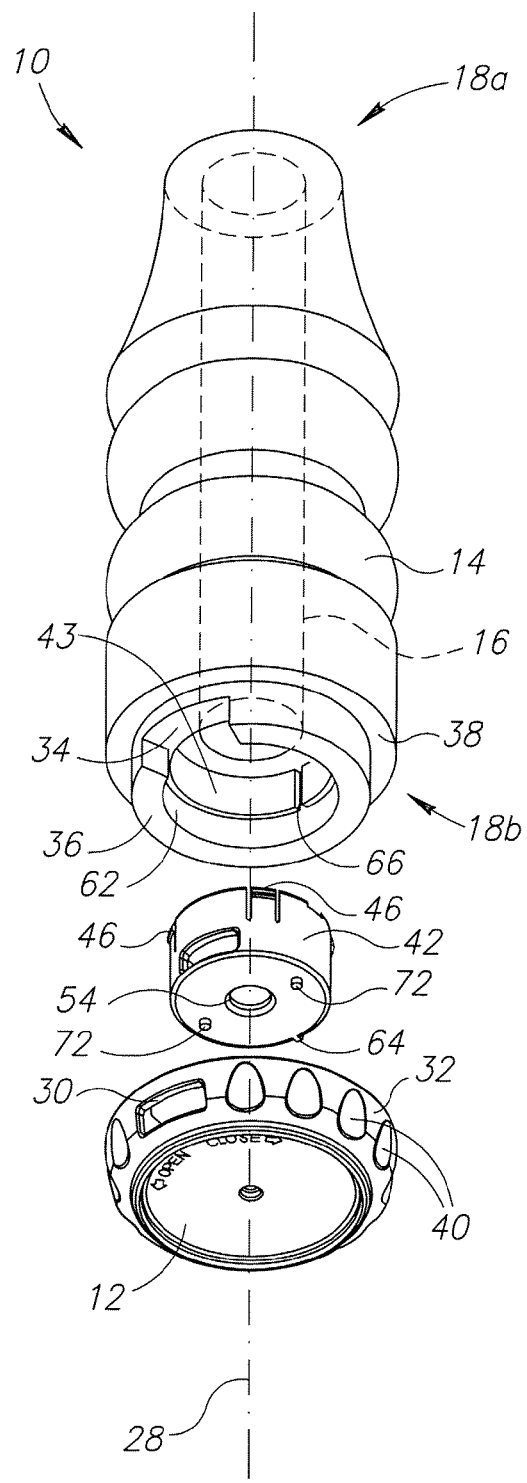
FIGS. 2A and 2B are exploded views of peppermills, in accordance with an embodiment of the present invention.
Figure 2A:
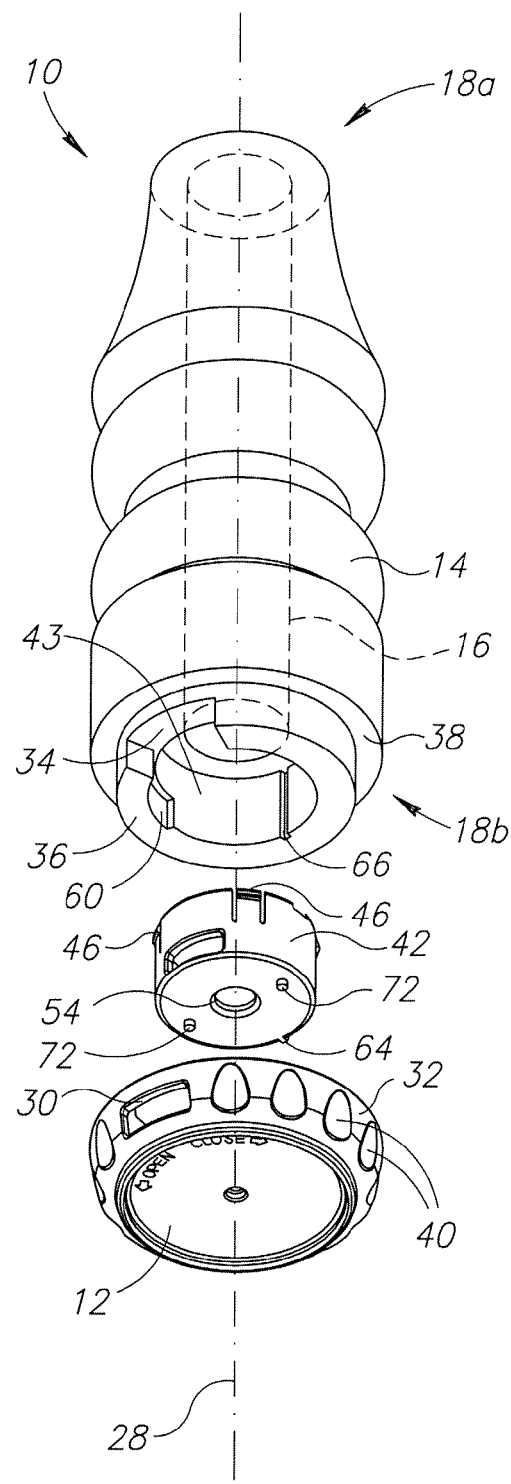

Referring to FIGS. 1, 2A, and 2B, a preferred embodiment of a peppermill 10 includes a cap 12 mounted to a body 14 formed of wood, plastic, or other material. The body 14 includes an internal cavity 16 between the upper end 18a and lower end 18b. The cavity 16 houses a grinding mechanism 20 for grinding peppercorns. A shaft 22 extends from the grinding mechanism to a knob 24 positioned at the upper end 18a of the peppermill 10. The knob 24 is removable by loosening a nut 26 secured to the shaft 22.

The above peppermill construction is one preferred form, but any peppermill may be used with the present invention. Thus, there need not be a knob 24, shaft 22, and internal cavity 16. Instead, any device capable of grinding may be used. Likewise, the mill need not be capable of grinding pepper, but rather can grind salt, spices, or other items.

The cap 12 in the preferred embodiment is rotatable about a longitudinal axis 28 extending through the body 14. The cap 12 includes a lateral opening 30 extending through cap 12, such as through a rim 32 of the cap 12. The lateral opening 30 typically extends through the rim 32 in a direction substantially perpendicular to the longitudinal axis 28.

The cap 12 may be rotated such that the lateral opening 30 is brought into and out of alignment with a gap 34, or other opening formed in the body near the lower end 18b. The gap 34 may be formed in a ridge 36 formed at the lower end of the body 14. The rim 32 may have a height such that the rim 34 abuts a shoulder 38 encircling the ridge 36 when the cap 12 is secured to the body 14. Projections 40 are formed on the cap 12 to facilitated gripping of the cap 12 during rotation. In an alternative embodiment, a projection having sufficient size to cover the opening 30 extends from the body 14 such that the projection may be positioned over the opening 30 when the cap is in a closed position.

The cap 12 may secure to the body 14 by means of an insert 42 inserted within recess 43 adjacent the cavity 16. The recess 43 is typically concentric with the cavity 16 and has a slightly larger diameter. The insert 42 includes an insert opening 44 extending through the insert in a direction substantially perpendicular to the longitudinal direction. The insert opening 44 is preferably substantially aligned with the gap 34. The insert 42 may be shaped as a cup retained within the cavity 16 by means of a friction fit or by means of a detent mechanism, such as hooked tabs 46 monolithically formed with the insert 42.

Figure 3:
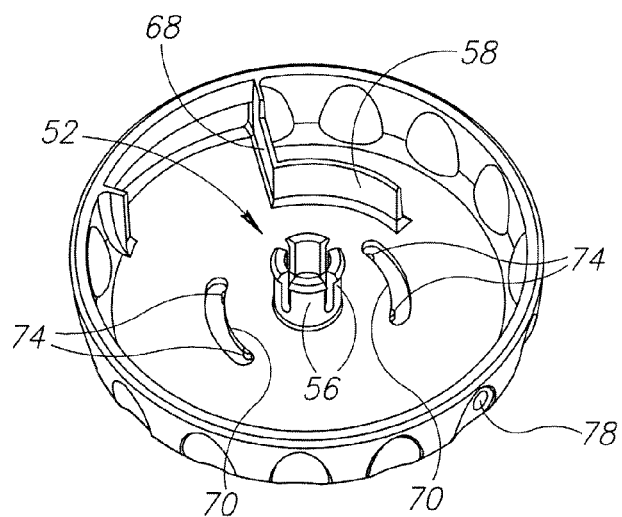
FIG. 3 is a perspective view of a cap suitable for use in the present invention.

Referring to FIG. 3, while still referring to FIGS. 2A and 2B, the cap 12 includes a post 52 sized to fit within an aperture 54 formed in the insert 42. The post 52 includes a plurality of hooked tabs 56 that elastically deform to allow the post to insert within the aperture 54 and exert a biasing force resisting removal of the post 52 from the aperture 54.

The cap 12 further includes an arcuate flange 58 having a radius of curvature centered approximately at the longitudinal axis 28 when the cap 12 is secured to the body 14. The arcuate flange 58 is positioned adjacent the lateral opening 30 spaced apart from the rim 32 such that the ridge 36 is positionable between the arcuate flange 58 and the rim 32.

In the embodiment of FIG. 2A, a recess 60 is formed in the ridge 36 adjacent the gap 34 to receive the flange 58. In the embodiment of FIG. 2B, a larger diameter portion 62 is formed in the body forming a gap between the insert 42 and the ridge 36 when inserted to receive the arcuate flange 58. In some embodiments, the insert 42 is provided with a projection 64 engaging a groove 66 formed in the body 14 to align the insert opening 44 with the gap 34. In the embodiment of FIG. 2A, the groove 66 extends across the ridge 36 and into the cavity 16. In the embodiment of FIG. 2B, the groove 66 extends from the boundary of the large diameter portion 62 into the cavity 16. In the embodiment of FIG. 2B, the projection 64 may extend to the lowermost surface of the insert 42 such that the projection 64 is visible to aid a user in centering the insert 42 during insertion.

A stop 68 is formed on the cap 12 circumferentially between the arcuate flange 58 and the lateral opening 30. The stop 68 and arcuate flange 58 may be formed as continuous ridge of material secured to the cap 12. The stop 68 engages the ridge 36 to limit rotation of the cap 12 to movement between an open position in which the lateral opening 30 is positioned within the gap 34 and a closed position in which the arcuate flange 58 is positioned over the insert opening 44 and the lateral opening 30 is positioned over the ridge 36.

The cap 12 includes one or more arcuate grooves 70 having a radius of curvature substantially centered on the longitudinal axis 28 when the cap 12 is secured to the body 14. The insert 42 includes one or more posts 72 corresponding to the grooves 70 and positioned within the grooves 72 when the cap 12 is secured to the insert 42. Detents 74 are positioned near the ends of the grooves 70 and resist movement of the posts 72 both into and out of the ends of the grooves 70. The grooves 70 have angular sizes corresponding to the range of motion of the cap 12 between the open and closed positions, such that the detents 74 tend to retain the cap 12 in the opened and closed positions. In the illustrated embodiment, the detents 74 are embodied as small projections extending into the grooves 70.

In some embodiments, the cap 12 bears an indicator 78 printed on, formed in, or secured to, the cap 12 opposite the lateral opening 30. The indicator 78 facilitates use of the peppermill 10 by indicating to a user that the lateral opening 30 is oriented downwardly when the indicator is facing upward.

Figures 4A, 4B:
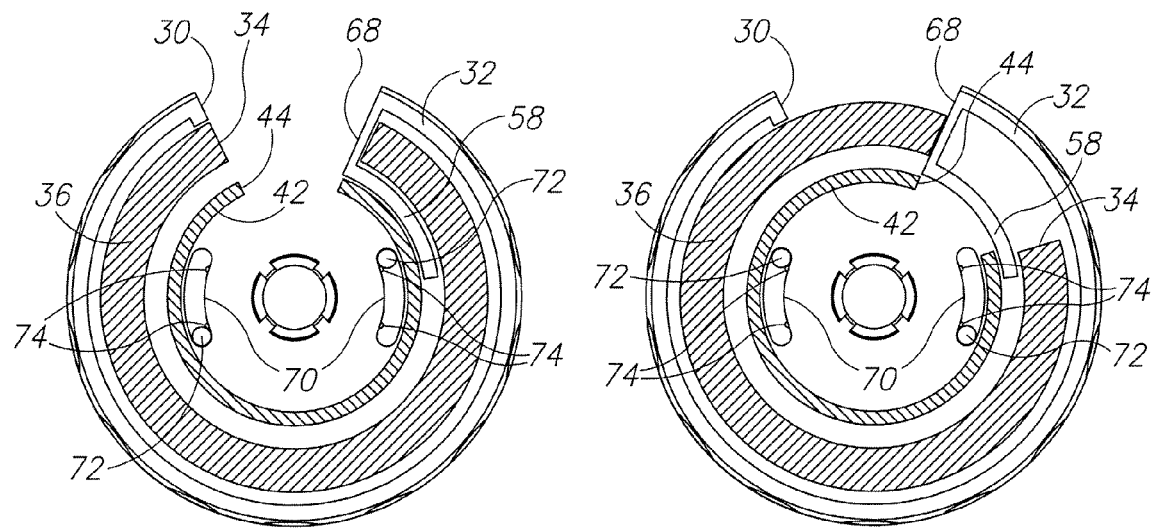
FIGS. 4A and 4B are cross sectional views illustrating a method for closing a peppermill, in accordance with an embodiment of the present invention.

FIG. 4A illustrates cross sectional view 4 of the peppermill 10 having the cap 12 in an open position. In the open position, the lateral opening 30, gap 34, and insert opening 44 are substantially aligned allowing ground pepper to pass therethrough. FIG. 4B illustrates cross sectional view 4 of the peppermill 10 in a closed position. To close the peppermill 10, the cap 12 is rotated to the closed position having the lateral opening 30 positioned over the ridge 36. The arcuate flange 58 is positioned over the insert opening 44.

Various alternative embodiments of the invention are possible. In one embodiment, the ridge 36 and gap 34 are replaced by a projection extending outwardly from the body 14 substantially parallel to the longitudinal axis 28 and positionable over the opening 30 when the cap 12 is rotated into the closed position.

In the preferred embodiment, the arcuate flange 58 covers the opening 44 in the insert 42 and the rim 32 covers the gap 34 in the closed position. However, good results may be obtained by using only one of these closure means. Thus, for example, the flange 58 may be eliminated in order to rely on the rim 32 to cover the gap 34 or other opening formed in the body 14. Alternatively, the ridge 36 is eliminated such that the opening 30 is left open and positioning of the flange 58, or other structure constrained to rotate with the cap 12, over the opening 44 is relied upon for closure.

In some embodiments, a sliding member or door secures to the cap 12, such as along the rim 32, such that the sliding member is slidable over the opening 30 in order to close the opening 30. In such embodiments, the cap 12 need not be rotatable with respect to the body 14 or insert 42.

In another alternative embodiment, the opening 30 in the cap 12 and the opening 44 in the insert 42 may extend through the cap 12 and insert 42, respectively, in a direction substantially parallel to the longitudinal axis 28. In such an embodiment, the arcuate flange 58 may be substituted by a substantially planar flange oriented perpendicular to the longitudinal axis and positionable over the opening 44. In such an embodiment, the opening 30 may be positioned over a portion of the body 14 or insert 42 in order to close the opening 30.

In another embodiment, the cap 12 is in threaded engagement with the body 14 or insert 42, such that the cap 12 may be unthreaded to move the cap 12 away from the body 14 to create a gap between the cap 12 and body 14. Ground pepper may then be allowed to escape through the gap. In the closed position, the cap 12 is threaded toward the body to close the gap. In such an embodiment, the opening 30 in the cap 12 may be omitted. In embodiments including the opening 30, the opening 30 is positioned over a ridge or flange secured to the body 14 or insert 42 when the cap 12 is in the closed position.

In still other embodiment, the cap 12 fits within a recess formed in the body 14. For example, the cap 12 may be encircled by the ridge 36, or other structure located at the base of the body 14. In such embodiments, the arcuate flange 58 may be eliminated and the rim 32 of the cap 12 may serve to block the opening 44 in the insert 42. As in the embodiment of FIGS. 1-4B, an opening 30 in the cap 12 may be aligned with a gap 34 in the ridge 36, or other opening formed in the body 14, when the cap 12 is in an open position. Alternatively, an opening 30 in the cap 12 may be aligned with a projection secured to the body 14 in order to close the opening 30.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A peppermill comprising:
    a body configured to hold peppercorns, the body having an upper end, a lower end, and a longitudinal axis;
    a grinding mechanism attached to the body;
    a grippable member positionable within the body and engageable with the grinding mechanism to actuate the grinding mechanism;
    an opening defined on the peppermill and substantially perpendicular to the longitudinal axis, the opening having a cap to selectively close the opening and substantially prevent ground pepper from falling from the peppermill when the cover is in a closed position;
    an insert secured within the body proximate the lower opening, the cap rotatably mounted to the insert; and
    a groove formed along a cavity formed in the body, the groove extending substantially parallel to the longitudinal direction and wherein the insert further comprises a projection sized to fit within the groove.

2. The peppermill of claim 1, wherein the cavity further comprises a constricted portion positioned between the grinding mechanism and the lower opening, the constricted portion having a diameter smaller than the lower opening, the insert sized to fit within the constricted portion.

3. The peppermill of claim 2, wherein the insert comprises a cap having a concave surface facing the upper end and a lower portion extending outwardly from the constricted portion, the lower portion having an insert opening extending therethrough in a direction substantially perpendicular with the longitudinal axis, the insert opening substantially aligned with the gap.

4. The peppermill of claim 1, wherein the cap comprises an arcuate flange positioned radially between the lower portion and the cavity, the arcuate flange positionable over the insert opening.

5. The peppermill of claim 2, wherein the arcuate flange is not positioned over the insert opening when the lateral opening of the cap is aligned with the insert opening.

6. The peppermill of claim 5, wherein the cap further comprises a stop selectively engageable with at least one of the body and insert to limit rotation of the cap, the stop restricting the cap to movement between positions having the arcuate flange positioned over the insert opening and positions wherein the lateral opening is aligned with the insert opening.

7. The peppermill of claim 2, wherein the insert further comprises a detent engageable with the constricted portion to retain the insert within the constricted portion.

8. A peppermill comprising:

a body configured to hold peppercorns the body having an upper end, a lower end, and a lateral surface extending between the upper end and the lower end;

a grinding mechanism attached to the peppermill;

a grippable member engageable with the grinding mechanism to actuate the grinding mechanism;

an opening defined on the lateral surface; and a cap configured to selectively open or close the opening and secured to the lower end of the peppermill, the cap being configured for rotation about a longitudinal axis extending from the upper end of the body to the lower end of the body.

* * * * *